July 12, 1955 — J. A. MONTLLOR — 2,713,144
ELECTRICAL IMPEDANCE UNIT
Filed Nov. 22, 1949
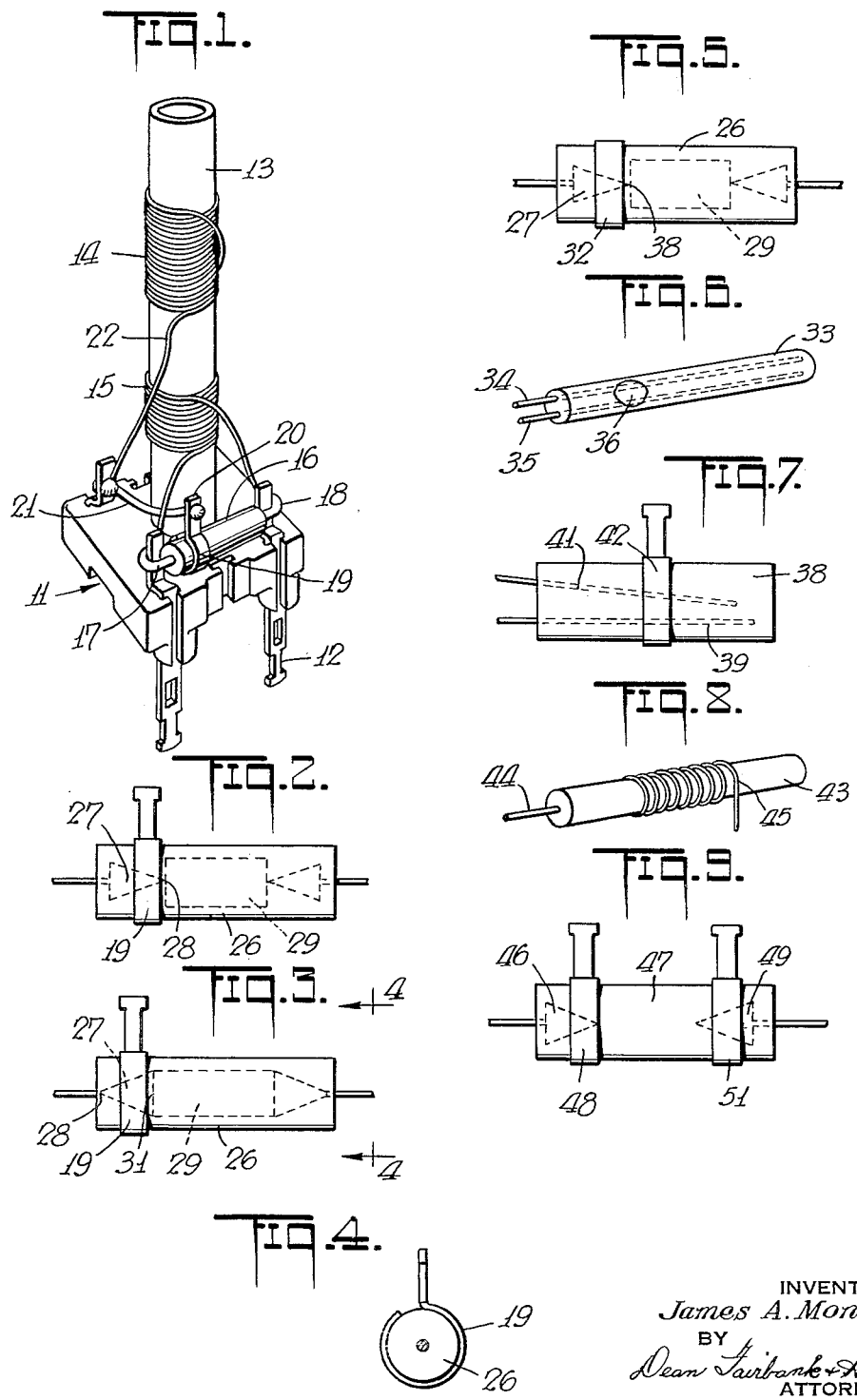
INVENTOR
James A. Montllor
BY
Dean Fairbank & Hirsch
ATTORNEYS

United States Patent Office 2,713,144
Patented July 12, 1955

2,713,144

ELECTRICAL IMPEDANCE UNIT

James A. Montilor, Morristown, N. J., assignor to Essex Electronics, a corporation of New Jersey Application November 22, 1949, Serial No. 128,785

2 Claims. (Cl. 323—74)

This invention relates to electrical impedance units, more particularly capacitors and combined capacitors and resistors of the type utilized with radio-frequency transformers and coils.

Where conventional fixed capacitors of the type comprising conducting plates embedded in an encompassing dielectric casing are employed for capacitative coupling between the primary and secondary of radio frequency transformers, in addition to the cost of such capacitors being relatively great in relation to the cost of the other components used in the unit, the latter must be made of larger size in order to accommodate such capacitors and where many radio frequency transformers are used, as in a radio receiver, the overall increase in size of the receiver unit may be objectionable, especially when such receivers are used in small, compact devices such as guided missiles or the like.

In addition, where such capacitors are of fixed value, it may be necessary, in order properly to tune the circuit in which they are used, to incur the expense and inconvenience of having a large number of differently calibrated capacitors on hand.

It is accordingly among the objects of the invention to provide a capacitor that may be incorporated in a radio frequency transformer without any material increase in the size or cost thereof, and which may readily be adjusted properly to tune the circuit.

Another object is to provide capacitative coupling between the primary and secondary windings of a resistance loaded radio frequency transformer without resort to a distinct capacitor unit or supporting facilities therefor and with the minimum of wiring.

According to one aspect of the invention, a substantially tubular body of dielectric material having a metallic element embedded in an end thereof, has a metallic element encompassing a portion of such body desirably over said embedded metallic element, the metallic elements with the intervening dielectric forming a capacitor. Preferably the embedded metallic element is substantially conical in shape with the axis of the cone extending longitudinally of the tubular body whereby when the external metallic element is slid along the body over the embedded element, the spacing between the outer surface of the embedded element and the inner surface of the external element will be changed to vary the capacitance of the unit.

According to another aspect of the invention, the tubular body has a metallic element embedded in each end thereof with a resistive element embedded in the body between the end elements and in contact therewith, a metal element encompassing a portion of said tubular body desirably over one of said ends.

According to still another aspect of the invention a body of dielectric material has a plurality of spaced wires embedded therein, said spaced wires and intervening dielectric material forming a capacitor. A spot of conductive material is applied to the outer surface of the dielectric body, whereby upon removal of material from or addition of material to such spot the capacity of the capacitor may be changed.

According to still another aspect of the invention, a substantially tubular body of dielectric material has a wire embedded therein desirably at an acute angle to the outer wall of said body and a metal element encompasses a portion of said body, the wire and metal element with the intervening dielectric forming a capacitor whereby upon movement of said metal element along the body the capacitance of the unit may be changed.

According to still another aspect of the invention, a substantially tubular body of dielectric material has a wire embedded therein and a second wire is coiled about the circumference of said body, the two wires and intervening dielectric forming a capacitor, the value of which may be varied by addition of turns to or removal of turns from the coiled wire.

In the accompanying drawings in which are shown one or more of various possible embodiments of the several features of the invention, Fig. 1 is a perspective view of a radio-frequency transformer incorporating the present invention, Figs. 2 and 3 are diagrammatic views of two different embodiments of the invention, Fig. 4 is an end view taken along line 4—4 of Fig. 3.

Fig. 5 is a diagrammatic view of a modification of the device shown in Fig. 2, and, Figs. 6 to 9 inclusive, are diagrammatic views of other embodiments of the invention.

Referring now to the drawings, the radio-frequency transformer shown in Fig. 1 is substantially conventional in construction, comprising a base 11 of insulating material such as "Bakelite," illustratively having four terminal lugs 12, one at each corner thereof and desirably protruding beyond the upper surface of the base. An upstanding coil form 13 is mounted on the base 11 and illustratively has two coils 14 and 15 wound thereon.

The transformer is resistance loaded in the illustrative embodiment shown herein, by means of a resistor 16, the terminals 17 and 18 of which are affixed to the protruding ends of a pair of terminal lugs 12 to which the ends of coil 15 are also affixed.

To provide for top side capacitive coupling between coils 14 and 15, a metal element illustratively a clip member 19 is desirably provided on the exterior of resistor 16 preferably encompassing the latter near one end thereof. The free end 20 of the clip 19 is connected by a lead 21 to a protruding end of a terminal lug 12, as is one of the leads 22 from coil 14, the other lead (not shown) of said coil 14 being connected to the remaining terminal lug 12 to complete the circuit.

The resistor 16 could be of any of the types shown in Figs. 2, 3 and 5. Thus the body 26 of the resistor is desirably cylindrical in shape and of dielectric material and the metallic elements 27 embedded in the body 26 at each end thereof respectively are desirably conical with their axis extending longitudinally of the resistor body 26. The tip ends 28 of the metallic elements 27 may abut against the resistive material 29 also embedded in the body 26 as shown in Figs. 2 and 5 or the base 31 of the metallic elements 27 may abut against the resistive material 29 as shown in Fig. 3.

With the construction herein described, when the transformer is assembled it may readily be tuned by sliding the clip 19 of Figs. 1, 2 and 3 along the end of the resistor body 26 over the element 27. Thus the capacitance will vary depending upon the spacing between the element 27 and the clip 19. When the transformer is properly tuned a drop of cement may be placed on the clip 19 so that it will be retained in its selected position on the resistor body 26.

If desired, instead of a clip 19, as shown in Fig. 5, an area of metallic material, preferably a band, 32 may be painted on the body 26 of the resistor over the element 27. To tune the transformer using the device shown in Fig. 5 it is merely necessary to remove or add metallic paint as required.

It is also to be understood that such metallic paint could be used in conjunction with the clips 19 shown in Figs. 1, 2 and 3, the clip 19 being moved for broad tuning and the metallic paint added or removed as desired for fine tuning.

In the embodiments of Figs. 1, 2 and 3 and the embodiment of Fig. 5 the clip 19 and the band 32 respectively are desirably positioned on the resistor body 26 so as not to extend over the resistive material 29 therein, for which such arrangement the "Q" of the capacitor (formed by the outer surface of metallic element 27, inner surface of the clip 19 or band 32 and the intervening dielectric body 26) is highest.

In the embodiment of the capacitor shown in Fig. 6, a section of wire 33 having two leads 34 and 35 embedded therein is provided, the leads 34 and 35 together with the intervening material of the section which desirably is of some dielectric material such as polyethylene, forming the capacitor.

In order to facilitate adjustment of the capacitor shown in Fig. 6, a drop of metallic paint 36 is put on the outer surface of the section 33 and functions as the plate of a capacitor in parallel with the capacitor formed by wires 34 and 35 with its intervening dielectric. Thus, by merely removing or adding paint the overall capacitance of the unit may be changed.

In the embodiment shown in Fig. 7, a substantially cylindrical casing 38 of dielectric material is provided in which is embedded two wires 39 and 41 which form the plates of the capacitor. Desirably one of the wires, i. e. wire 41 is at an angle to the other, so that when the clip 42 which encompasses the casing 38 is slid along the length thereof, it functions as the plate of a capacitor in parallel with the main capacitor formed by wires 39 and 41 and the intervening dielectric and the overall capacitance of the unit may be varied depending upon the spacing of the clip 42 from the inclined lead 41.

In the embodiment shown in Fig. 8, a substantially cylindrical casing 43 of dielectric material is provided in which is embedded a wire 44. Wound around the circumference of the casing 43 is a wire 45, the wires 44 and wires 44 and 45 functioning as the two plates of a capacitor with the intervening material of the casing as the dielectric therebetween. By increasing or decreasing the number of turns of wire 45 the capacitance of the unit may readily be changed.

In Fig. 9 is shown a unit similar to the one shown in Fig. 3, but devoid of any resistive material. Thus the metallic element 46 embedded in the dielectric casing 47 and the clip 48 form the plates of one capacitor and the metallic element 49 and clip 51 form the plates of another capacitor, the capacitance of said units being readily varied by the moving of the clips 48 and 51 respectively.

With the constructions heretofore described, capacitors may be formed at a relatively low cost and as they are readily adjustable, it is not necessary to have a large stock of many assorted sizes on hand.

In addition, the small size of the capacitors and especially those shown in Figs. 2, 3 and 5 which may be associated with components already in the circuit without any material increase in the size of the combined unit enable components of small size to be designed.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. An article of the character described comprising an elongated body of dielectric material, a resistive element embedded in said body, a metallic element of greater cross section at one end than at the other embedded in said body and in electrical contact with one end of said resistive element, and an adjustable metallic element on the exterior of said body over said embedded metallic element, said metallic elements and intervening dielectric material forming a capacitor.

2. An article of the character described comprising an elongated body of dielectric material, a resistive element embedded in said body, a metallic element, substantially conical in contour embedded in said body and in electrical contact with one end of said resistive element, the axis of the cone extending substantially longitudinally of the elongated body, and a bent metal piece encompassing the body and movable along the length thereof said metal piece, said dielectric body and said embedded metallic element forming a capacitor, whereby the spacing between the outer surface of said embeded metallic element and the inner surface of said metal piece may be varied as the latter is moved along the length of the dielectric body to vary the value of said capacitor.

References Cited in the file of this patent

UNITED STATES PATENTS

| | | |
|---|---|---|
| 1,568,274 | Grimes | Jan. 5, 1926 |
| 1,641,635 | Klein | Sept. 6, 1927 |
| 1,672,367 | Cardwell | June 5, 1928 |
| 1,672,641 | Dreyer | June 5, 1928 |
| 1,715,319 | Houck | May 28, 1929 |
| 2,111,710 | Van Loon | Mar. 22, 1938 |
| 2,195,095 | Rinia | Mar. 26, 1940 |
| 2,210,029 | Egerlund | Aug. 6, 1940 |
| 2,383,463 | Benin | Aug. 28, 1945 |
| 2,464,377 | Cohen | Mar. 15, 1949 |
| 2,477,688 | Dyer | Aug. 2, 1949 |
| 2,492,742 | Grasheim | Dec. 27, 1949 |
| 2,569,036 | Benner et al. | Sept. 25, 1951 |
| 2,575,364 | Sink | Nov. 20, 1951 |

FOREIGN PATENTS

| | | |
|---|---|---|
| 207,649 | Great Britain | Dec. 6, 1923 |